Jan. 25, 1966 H. R. BROWN 3,230,677
SEALING STRUCTURE AND RELATED STRUCTURES
Filed March 26, 1963
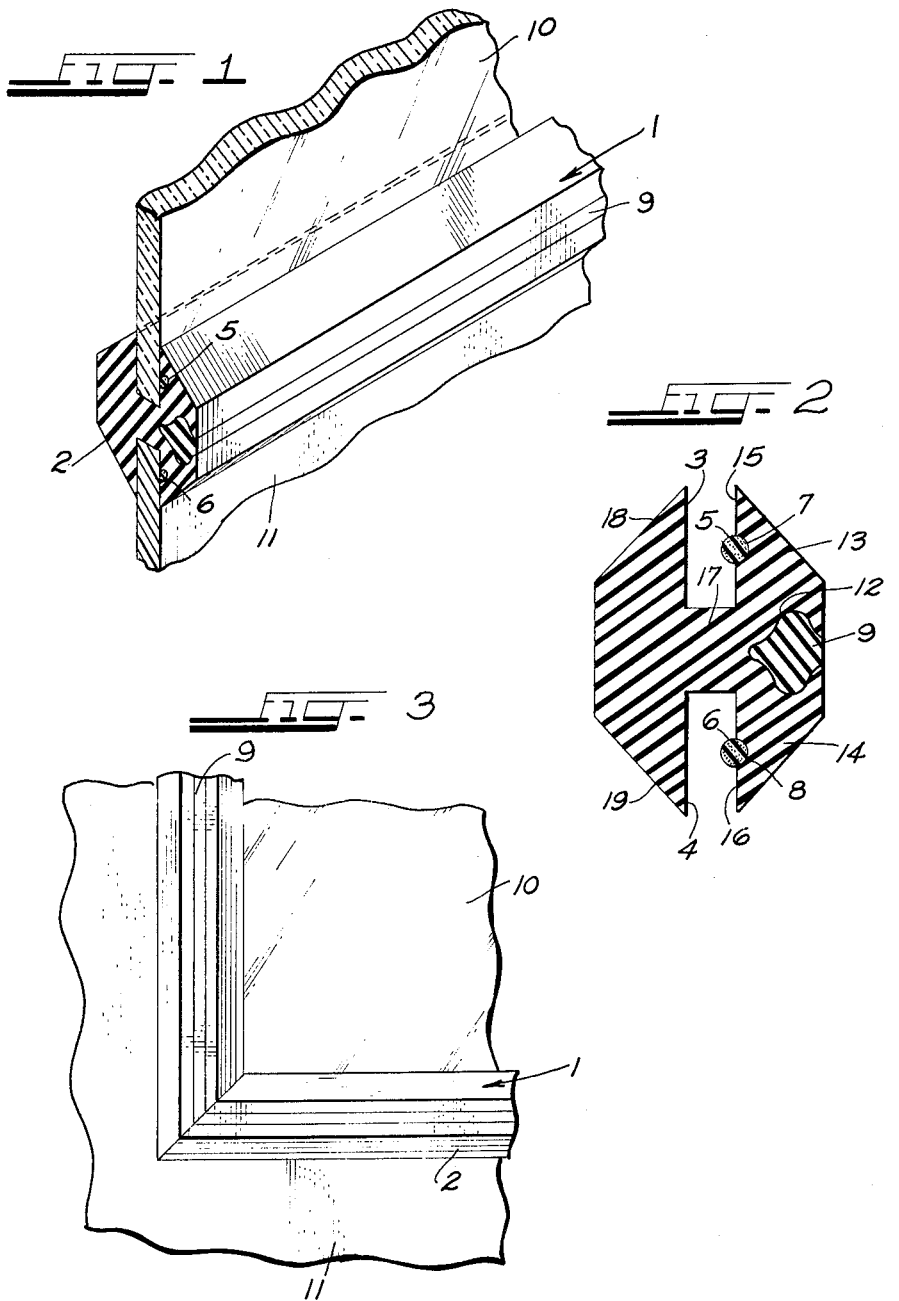
INVENTOR.
HOWARD R. BROWN 3,230,677
SEALING STRUCTURE AND RELATED
STRUCTURES
Howard R. Brown, Bowling Green, Ohio, assignor to The D. S. Brown Company, North Baltimore, Ohio, a corporation of Ohio
Filed Mar. 26, 1963, Ser. No. 268,019
1 Claim. (Cl. 52—208)

This invention pertains to dust-tight, liquid-tight mountings of plate-like members, such as panels, strips and the like and has more particular reference to improvements in sealing strips or gasket seals for effecting dust-tight, liquid-tight seals.

Briefly, this invention pertains to sealing strips or gasket seals having slots in which are tightly fitted the edge or edges of panel-like members, such as windows, or other glass plates, metal panels or strips, wooden panels or strips or the like. The invention has application in the fields of building structures, vehicle structures and the like.

The dust-tight, liquid-tight seal is provided by mounting an edge of a panel-like member or a strip member in a slot of an elastomer sealing strip or gasket seal. The sealing strip has mounted on at least one side wall of the slot a cellular strip of a closed cell, cellular elastomer which projects beyond the side wall into the slot. When the edge of the panel-like member or strip member is tightly fitted into the slot, the cellular strip is compressed and forms between itself and the contacting wall of the inserted panel-like member or the inserted strip a dust-tight, liquid-tight seal.

Among the prior art techniques for forming liquid-tight seals between a sealing strip or gasket seal and a panel-like member are the use of liquid sealing material or uncured butyl tape to seal panels or windows in a sealing strip, gasket seal, or a slotted frame. One of the shortcomings of such sealing techniques is their tendency to bridge over irregularities in the side walls of the slots in which edges of the panel-like members are inserted. This bridging effect leaves unsealed voids in the joint between panel-like member and the slot in which it is inserted. On the other hand, the strips of cellular material used in accordance with the invention follow the contour of such irregularities and form a continuous liquid-tight, dust-tight seal.

Among the advantages of the invention may be listed improvements in economies of manufacture of sealing strips or gasket seals, long life of the seal in the assembled structures, and labor savings by facilitation of assembly of panels and the like with liquid-tight, dust-tight seals because the cellular strip provides a dry seal which facilitates easier sliding of the panel-like member or strip member in place in the sealing strip or gasket seal. Furthermore, the dry seal provided by the invention eliminates the necessity of cleaning the inserted panel, window or strip to remove substances such as liquid seal or uncured butyl rubber, which sometimes exudes from the slot.

Accordingly, it is a primary object of the invention to provide improvements in structures for effecting a liquid-tight joint between a sealing strip or gasket seal and a member mounted therein. Another object of the invention is to provide improvements in dry seal structures for mounting panel-like or strip members.

Still another object of the invention is to provide improvements in strip seals or gasket seals in which is mounted an edge of a member with a liquid-tight joint between said member and the sealing strip or gasket seal.

A still further object of the invention is to provide elastomer sealing strips utilizing closed cell, cellular strips to provide a liquid-tight seal.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:
FIG. 1 is a perspective view at a section of a sealing strip with a pair of panel members mounted therein;
FIG. 2 is a transverse section of the sealing strip of FIG. 1, and;
FIG. 3 is a fragmentary view of a corner of a pair of panel members mounted in a sealing strip of the invention.

To illustrate the invention, the drawings show a sealing strip or gasket seal 1 comprising an elastomer body 2 made of natural rubber, modified natural rubber, synthetic rubber or the like. The strip 1 has a pair of oppositely-disposed, outwardly-opening, rectangular, longitudinal slots 3, 4. The slots 3, 4 may be in other relative positions, e.g., at right angles to each other, for certain uses or, in other instances, a single slot or more than two slots may be employed in the strip 1.

One of the side walls of each of the slots 3, 4 have mounted thereon longitudinally-extending, sealing strips 5, 6 made of a weather-resistant, closed cell, cellular elastomer, e.g., closed cell, cellular neoprene, closed cell, cellular ethylene-propylene rubber, and the like. The strips 5, 6 are positioned near the outer edge of the slots 3, 4. They may be mounted in the side wall of the slots by the provision of a longitudinally-extending groove 7, 8 in the side wall, the groove being of a depth so that a portion of the strips 5, 6 project inwardly into the slots 3, 4 beyond the side wall in which they are mounted. The strips 5, 6 are held in the grooves 7, 8 by an adhesive, or they may have special, mating shapes with the grooves 7, 8 to provide an interlocking structure capable of holding the strips 5, 6 in the side walls without the use of adhesive or the like. The strips 5, 6 shown in the drawings are circular in cross-section, but it is contemplated that other shapes, such as triangular, rectangular, hexagonal, octagonal, ovular, etc. may be employed, as well as cross-sectional shapes in which the strips have a dovetail-like shape mating with a similar shape of the grooves 7, 8 to provide an interlocking structure.

When a panel member, strip or the like is fitted tightly in the grooves 3, 4 as shown in FIG. 1, the cellular strips 5, 6 are compressed. These strips form a fluid-tight, dust-tight seal between the side of the panel member and the inner walls of the slots 3, 4. The members inserted in the slots 3, 4 may be of diverse character, e.g., a glass sheet, plate or panel 10, a metal or wooden panel 11, a metal or wooden strip mounted on a frame member or the like. While not being limited thereto, the invention is especially adapted for the mounting of glass sheets, plates or panels in window frames, door frames and the like wherein a weather-tight seal is desired. In the illustrated case, only one side of the slots 3, 4 is provided with the cellular sealing strips 5, 6, but it is recognized that in certain instances similar strips 5, 6 may be also provided on the opposite side wall of the slots 3, 4 where a weather-tight seal is desired on both sides of the structure.

The sealing strip or gasket seal 1 may have a longitudinal slot 12 in the side wall thereof in which is mounted a filler strip or zipper strip 9 made of rubber or the like, which may be as hard or harder than the elastomer from which the elastomer strip body 2 is made. With the filler strip 9 removed, the lips 13, 14 may be bent outwardly and downwardly to insert a glass panel or pane 10, a panel 11 or the like in each of grooves 3, 4. When the filler strip 9 is inserted in groove 12, the filler strip 9 exerts pressure against the lips 13, 14 of elastomer body 2 to press the faces 15, 16 of the lips, as well as the cellular strips 5, 6, against the pane 10 and panel 11, respectively, to effect a more perfect seal between the faces 15, 16 and cellular strips 5, 6 and the inserted members 10, 11. The sealing strips or gasket seals 1 may be mounted about a panel, such as a glass panel 10 by splicing the strip at each corner as shown in FIG. 3. The zipper strip groove 12 is in the side of the strip 1 adjacent the lips 13, 14 on which cellular strips 5, 6 are mounted. It is opposite and is directed inwardly toward the central web section 17 of the sealing strip 1. Lips 18, 19 may have cellular strips (not shown) like strips 5, 6 on lips 13, 14 to seal the opposite sides of slots 3, 4, if desired.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

A sealing strip comprising an elongated, elastomer strip having a substantially H-shaped cross section defined by a horizontal web joining a first, vertical leg and a second, vertical leg at substantially the mid-portions thereof, said legs being spaced apart and the opposing, inner walls thereof defining with said web a pair of vertically-aligned, elongated slots opening upwardly and downwardly, respectively, the outer sides of said legs sloping at an acute angle with respect to the respective inner walls of said legs to define relative sharp, elongated lips extending along the outer edges of said slots, one of said legs having an elongated, longitudinal groove in the outer wall thereof opposite said horizontal web, said groove permitting the upwardly and downwardly extending portions of said one of said legs to be bent outwardly, an elongated, longitudinal groove in the respective inner walls of each of said upwardly and downwardly extending portions of said one of said legs and spaced inwardly from the respective outer edges of said inner walls about midway between the respective outer edge and said horizontal web, an elongated, closed cell, cellular elastomer strip mounted in each of said last-mentioned grooves with a part of each of said strips projecting beyond its respective inner wall into the respective slot, and an elongated, elastomer filler strip of mating cross section with the cross section of said first-mentioned groove inserted in said first-mentioned groove to press said lips of said one of said legs and said closed cell, elastomer strips against the sides of the edge portions of respective panels when the latter are mounted in said slots, thereby comprising said closed cell, elastomer strips against said respective panels and forming dust-tight, liquid-tight, dry seals between the respective panels and the closed cell, elastomer strips.

References Cited by the Examiner

UNITED STATES PATENTS

| | | | |
|---|---|---|---|
| 2,017,556 | 10/1935 | Westrope | 296—44.5 |
| 2,121,827 | 6/1938 | Roberts | 20—69 |
| 2,203,522 | 6/1940 | Clark | 296—44.5 |
| 2,254,028 | 8/1941 | Cheston | 20—56.4 |
| 2,563,378 | 8/1951 | Schnee | 20—56.5 X |
| 2,606,635 | 8/1952 | Clingman | 189—78 |
| 2,878,535 | 3/1959 | Bush | 20—56.4 |
| 3,026,582 | 3/1962 | Bayer | 20—56.5 |
| 3,029,481 | 4/1962 | Henniges | 20—69 |
| 3,039,232 | 6/1962 | Dunn | 50—346 |

FOREIGN PATENTS

| | | |
|---|---|---|
| 957,068 | 1/1957 | Germany. |
| 96,335 | 7/1939 | Sweden. |

HARRISON R. MOSELEY, *Primary Examiner.*

REINALDO P. MACHADO, *Examiner.*